Patented Dec. 31, 1940

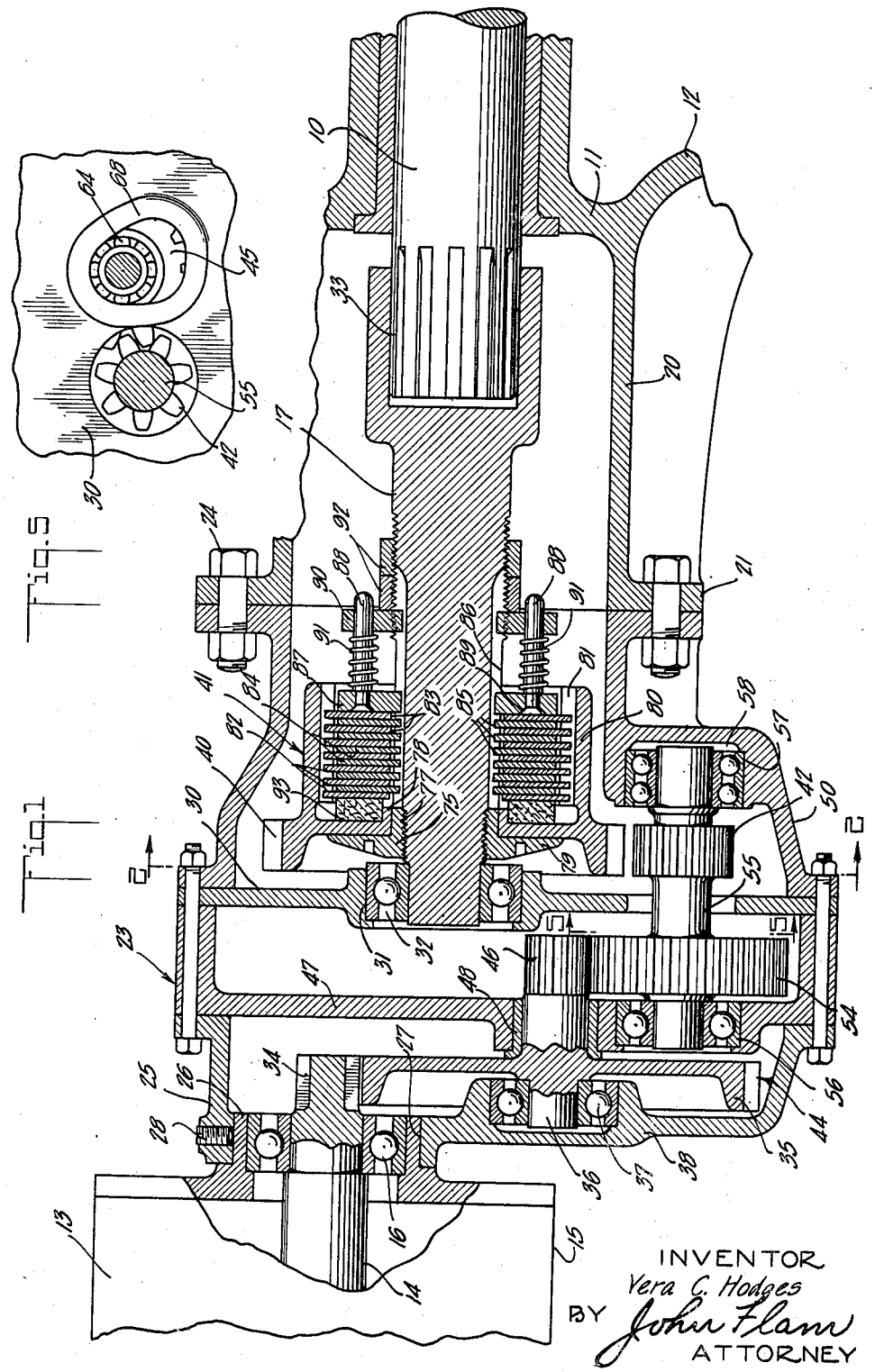

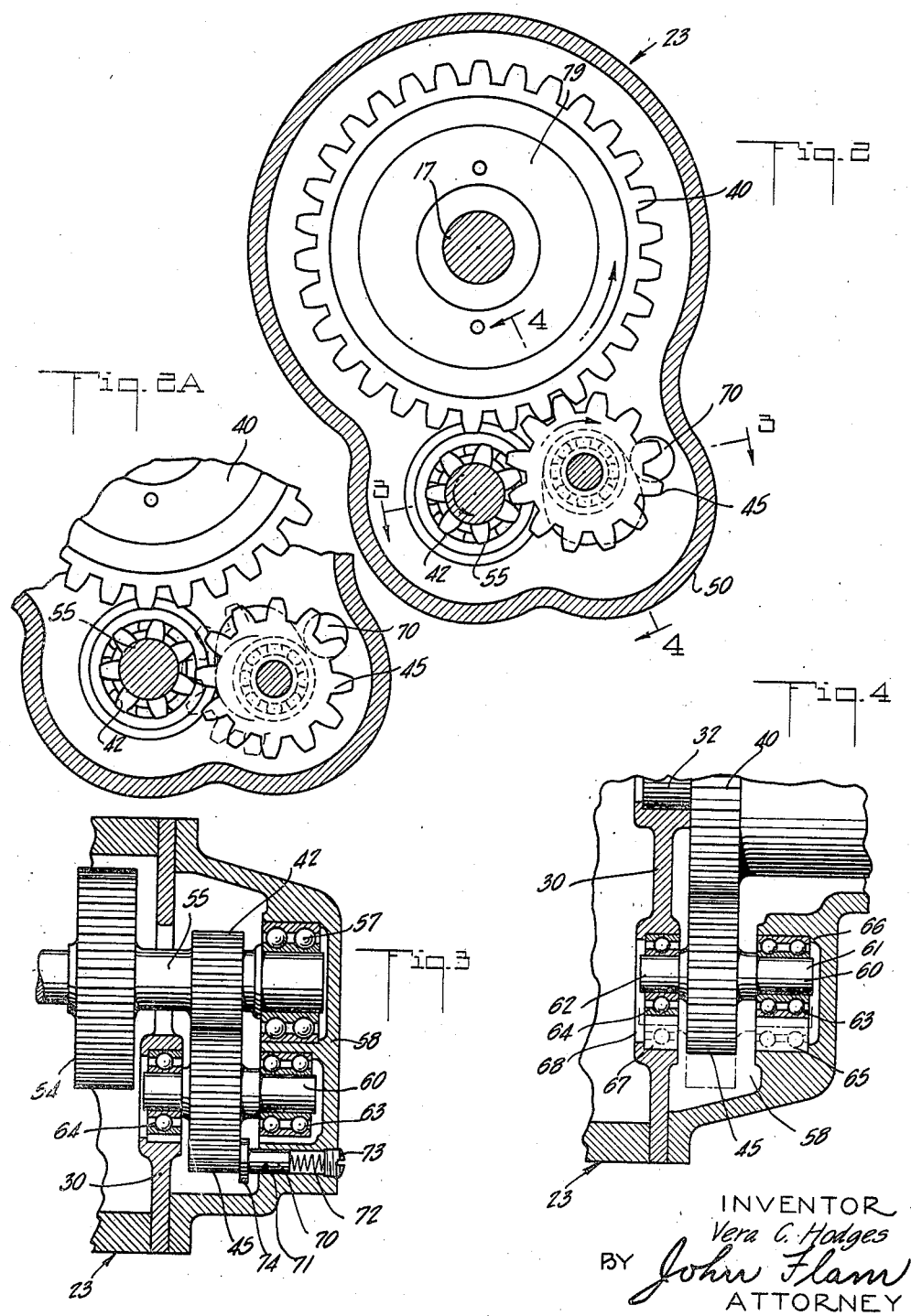

2,226,864

UNITED STATES PATENT OFFICE 2,226,864

TRANSMISSION MECHANISM FOR STARTING MOTORS

Vera C. Hodges, Los Angeles, Calif., assignor to Electrical Development Co. Inc., Los Angeles, Calif., a corporation of California Application December 8, 1939, Serial No. 308,215

5 Claims. (Cl. 74—8)

The invention relates to transmission mechanism and particularly to one useful for connecting a starter motor to an internal combustion engine, such as in automotive equipment.

Starter mechanisms are in general well known, and usually include a pinion arranged to be driven by the starting motor, which pinion is caused to engage a gear fixed on the engine crank-shaft, either directly or by means of an idler, upon energization of the starting motor. Thus rotation of the starting motor imparts rotation to the engine shaft. Upon the engine beginning to operate under its own power, the engine shaft rotates more rapidly than it does under the influence of the starter. To prevent such rotation causing the starter mechanism to rotate at a high and dangerous speed, the gearing is arranged so as to be immediately disconnected upon starting of the engine.

It is a principal object of this invention to provide such a mechanism, having an improved means for controlling the connection of the starting motor to the engine.

It is another object of this invention to provide such a mechanism in which the rotation of the starting motor is effective to urge the gears into driving relation without the use of springs or other mechanical connections.

It is another object of this invention to provide such a mechanism wherein the gears are immediately disengaged upon the engine's starting.

It is a still further object of this invention to provide such a transmission having means to prevent damage to the gearing or starting motor in case the engine backfires.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Figure 1 is a longitudinal section through the transmission, as installed in connection with an internal combustion engine;

Fig. 2 is a cross section as seen on the correspondingly numbered plane of Fig. 1; the idler being in driving position;

Fig. 2A is a view similar to Fig. 1, showing the idler in disengaged position;

Figs. 3 and 4 are detail sections as seen on the correspondingly numbered planes of Fig. 2; and Fig. 5 is a detail section as seen on plane 5—5 of Fig. 1.

Referring to the drawings, particularly Fig. 2, the driving gear 40 is shown as connected to the crank shaft 10 of an engine, and adapted to be driven by a starting motor 13 for operating the shaft 10.

The train of gearing for driving gear 40 may be now generally set forth. A pinion 42 is arranged to be driven by a source of power, as for example the starting motor; the manner in which this drive is accomplished will be set forth hereinafter. A transient idler, or floating pinion 45 is rotatably supported and is permitted a limited movement with respect to pinion 42. This movement is such as to maintain the axis of the idler always parallel to that of pinion 42. This movement of idler 45 is however restricted insofar that the idler may move into mesh with gear 40 or entirely out of engagement therewith, as well as into or out of mesh with pinion 42, but not entirely out of engagement with the pinion 42 (Figs. 2 and 2A). Thus pinion 42 may always exert a rotary torque to idler 45.

The idler 45 is arranged to move into and out of engagement with the spur gear 40, depending upon the relative speeds of rotation of pinion 42 and gear 40.

Referring to Fig. 2A which shows the mechanism at rest, if pinion 42 is rotated counterclockwise as indicated by the arrow, it will of course rotate idler 45 in the opposite direction; that is the portion of the idler 45 adjacent pinion 42 will travel upwardly while the opposite portion of the idler will move downwardly. To cause the idler 45 to move upward and engage gear 40, it is merely necessary to provide a restraint on the downwardly moving side of the idler to form a fulcrum or pivot about which the idler 45 may swing. Since the idler 45 and parts which it is necessary to raise in this manner are relatively light, the restraining force need not be great and may be supplied conveniently by a spring pressed pin 70 engaging one face of idler 45 near its periphery (Figs. 2, 2A, 3).

Thus, rotation of pinion 42 will cause idler 45 to swing upwardly about pin 70 into mesh with gear 40 and operatively connect pinion 42 with gear 40. Continued rotation of pinion 42 will cause idler 45 to rotate about its axis and impart this rotation to gear 40, the idler 45 being restrained by a suitable guide against further movement and slipping on the pin 70.

If gear 40 tends to rotate at a more rapid rate than that imparted to it by pinion 42, idler 45 will be rolled downwardly, the successive engagement of the teeth on idler 45 with the teeth on pinion 42 forming a virtual fulcrum about which the idler moves. In other words, as long as pinion 42 is driving gear 40, idler 45 being driven clockwise is urged about the fulcrum formed by pin 70 into engagement with gear 40. As soon as gear 40 tends to overrun or drive pinion 42, idler 45, still revolving clockwise, is urged about a fulcrum formed by the teeth of the idler and the pinion out of engagement with gear 40. This must occur since the latter formed fulcrum allows no slippage, whereas that fulcrum formed by pin 70 can slip readily.

Gear 40 may be arranged to drive the crank shaft 10 of an internal combustion engine, as in the present case, and pinion 42 may be arranged to be driven by a suitable source of power such as an electric motor, to impart rotation to the crank shaft until the engine operates under its own power. If now the starting motor is energized, the rotation of pinion 42 causes idler 45 to roll into mesh with gear 40, whereby the source of power rotates the crank shaft. When the engine starts, the crank shaft 10 and consequently gear 40 turn much faster than when driven by the source of power. This immediately throws idler 45 out of engagement with gear 40, which prevents the pinion 42 and the starting motor from being driven by rotation of the crank shaft.

Referring to Fig. 1 of the drawings, the crank shaft 10 of an internal combustion engine is shown as extending through an end wall 11 of the crank case 12. Crank case 12 is shown as provided with a cylindrical extension 20 terminating in a flange 21. A housing 23 including a wall or web 30 is suitably secured to flange 21. An extension shaft 17 is joined to crank shaft 10 as by a spline connection 33 and extends through extension 20 and into housing 23, a suitable anti-friction bearing 32 serving to support the shaft extension 17 in an opening 31 in web 30. The end of shaft 17 adjacent web 30 carries the driving gear 40. Driving gear 40 may be directly connected to shaft 17; or an overload connection, such as a clutch 41, may be interposed between them, to be more fully disclosed later. Pinion 42 is suitably supported with respect to gear 40 by that portion or member 50 of housing 23 which is connected to flange 21. Member 50 also provides a support for idler 45, as will be hereinafter described.

Pinion 42 could be driven directly by the starting motor 13, but to obtain sufficient speed reduction between the motor and the crank shaft 10 in such an arrrangement, the gear 40 would have to be of relatively large diameter. In order to make it possible to use a gear 40 of small diameter, the motor is arranged to drive pinion 42 by means of compound reduction gearing, generally indicated by 44.

The starting motor 13 is provided with armature shaft 14. The motor 13 may be of any suitable type; such motors are well known, and since the details thereof are not pertinent to the invention, the motor 13 will not be described further than to point out that the shaft 14 (Fig. 1) is suitably supported by bearings in the shell 15 of motor 13, the bearing at the right hand end of the shaft being indicated by 16. Shaft 14 may be operatively connected with shaft 17 and crank shaft 10 through gears 40, 42 and 45 and gear train 44.

A support must be provided for the motor 13 and its associated gearing; preferably such support may be formed directly on crank case 12. Thus, the housing 23 which serves to enclose the gearing is secured to flange 21 as by bolts 24, and has a hub 25 to which motor 13 is secured. For this purpose, the motor shell 15 has a cooperating hub 26 adapted to be inserted in the bore 27 of hub 25. Hub 26 may be secured in position in bore 27 in any convenient manner, as for example by means of a set screw 28.

The gear train 44 by means of which shaft 14 drives pinion 42 is shown as of the double reduction spur gear type by way of an example, but it will be obvious that other well known types of reduction gearing could be used. As shown, shaft 14 is provided with an integral pinion 34 of small diameter which meshes with a large diameter spur gear 35. Gear 35 may be formed integrally with a shaft 36, one end of which is carried by antifriction bearing 37 supported in a suitable recess in the outer wall 38 of housing 23. The opposite end of shaft 36 carries a pinion 46 of small diameter which may be formed integrally with shaft 36. Between pinion 46 and gear 35, shaft 36 is supported in a web or wall 47 of housing 23 by means of a suitable bushing 48. Pinion 46 in turn drives gear 54 together with its supporting shaft 55 to which is fixed pinion 42. One end of shaft 55 is supported in web wall 47 by means of an anti-friction bearing 56. The other end of shaft 55 is similarly supported in bearing 57 mounted in a lateral extension 58 of housing 23.

It will be readily apparent that rotation of shaft 14 will cause rotation of pinion 42 in the same direction and at a reduced speed, the amount of reduction depending on the relative sizes of the members of gear train 44.

The supporting means for the transient idler 45 will now be described. Referring to Figs. 3 and 4, it will be seen that gear 45 is secured to a short shaft 60 having projections 61, 62 on opposite sides of the gear. Shaft 60 may be conveniently formed integrally with gear 45. Anti-friction bearings 63 and 64 are secured respectively to shaft projections 61 and 62 in any convenient manner, as by having their inner races pressed on the respective projections.

The outer race of bearing 63 is accommodated in a recess 65 formed in extension 58 of the housing 23. Recess 65 has a shoulder 66 extending around its periphery and serving to prevent axial movement of bearing 63 and connected parts to the right. Bearing 64 is accommodated in a similar recess 67 formed in wall 30. Recess 67 has a shoulder 68 serving to prevent movement of bearing 64 and connected parts to the left. Recesses 65 and 67 are so formed that gear 45 is so supported as to be freely movable with respect to gears 40 and 42 within certain limits. Thus, in Fig. 2A, which shows the relative position of the idler 45 with the pinion 42 stationary, the idler 45 is supported at some position out of engagement with gear 40, as for instance that shown by the full lines with its teeth just engaging the teeth of pinion 42. Or it may occupy some position between these two. The supporting recesses 65, 67 are so arranged that idler 45 cannot approach pinion 42 any closer than necessary for proper meshing, as well as that idler 45 is maintained at least close enough for its teeth to just catch the teeth on pinion 42. Thus rotation of pinion 42 will always rotate the idler 45.

Recesses 65, 67 are also so shaped that the idler 45 may mesh with gear 40 and when so meshed idler 45 is also meshed with pinion 42 (see Figs. 2 and 5). Thus it will be seen that the particular shape of the recesses 65, 67 is such that idler 45 is not confined to any fixed path of travel, as it moves into or out of engagement with gear 40.

The pin 70 for causing the idler 45 to move into mesh with gear 40 is best shown in Fig. 3. It is slidably supported in a bore 71 adjacent recess 65 parallel to shaft 60. It is urged outwardly into frictional engagement with idler 45 by a spring 72 confined in bore 71 between pin 70 and plug 73. Pin 70 has a large flat head 74 to provide increased wearing surface where the pin engages gear 45.

It is not essential that antifriction bearings be used on idler shaft 60, or elsewhere in the transmission for that matter. By suitably proportioning recesses 65, 67, shaft 60 could be directly supported on their inner surfaces, without the use of bearings 63 and 64.

Gear 40 might be arranged to drive the crankshaft 10 directly, as by being secured to shaft 17. However, such an arrangement is not desirable, since in case the engine back fires and crank shaft 10 is thereby driven in the reverse direction, serious damage to the gearing is likely to result. This is because the armature and armature shaft, rotating at a relatively high speed, have considerable inertia, and the force exerted by the crank shaft 10 turning backwards is opposed to this inertia through the connecting gearing, which under these conditions becomes multiplying gearing. Thus, a relatively small amount of inertia acting on shaft 14 imposes a severe load on the gearing upon a reversal in the direction of rotation as well as direction of transfer of the force.

To prevent damage to the transmission, should such back fire occur, gear 40 is arranged to drive the crank shaft 10 through an overload clutch 41. This may be an ordinary friction clutch, so adjusted as to transmit torque reasonably in excess of that which motor 13 is capable of exerting through the gearing 40, 42, 45 and 44 and well within the strength of this gearing. However, if the torque for any reason rises to an amount exceeding this, such as would be apt to damage the gears, the clutch will slip. Thus, if during the operation of starting the engine, the engine happens to backfire so that the crank shaft turns in the opposite direction to that in which it was being cranked, the load imposed on the gearing by the starting motor attempting to drive the crank shaft in one direction and the engine back fire driving it in the other direction would be liable to wreck the transmission. Under such conditions, however, clutch 41 would merely slip, allowing the starting motor to continue to turn, while the crank shaft turns in the reverse direction. No injury will result.

The construction of clutch 41 will now be described. This clutch is of the dry plate type wherein alternate plates are connected to the driving member and are urged into frictional engagement with plates disposed between them which are connected to the driven member. A resilient member or members are used to urge the plates into engagement, provision being made to adjust the force exerted by this member to allow the plates to slip when the power which the clutch is called upon to transmit exceeds a predetermined limit.

Gear 40 is rotatably supported with respect to shaft 17 by means of a special nut 75 threadedly secured on shaft 17. Nut 75 has a hub 77 upon which a hub 78 of gear 40 is mounted for rotation, as well as a radial flange 79 to prevent gear 40 being moved to the left. Gear 40 has a cylindrical extension or flange 80 suitably secured thereon as by being formed integrally therewith. Extension 80 forms a clutch housing, the interior surface of which has a plurality of keys or splines 81 formed therein. A plurality of spaced friction disks or plates 82 are provided with peripheral notches slidably to engage these keys, the plates having central bores 83 to clear shaft 17. Interposed between plates 82 are plates 84, the outside edges of which clear keys 81. The central bores 85 of plates 84, however, are arranged to engage splines 86 formed on shaft 17. Plates 82 are thus constrained to rotate with the housing 80, but are free with respect to shaft 17, while plates 84 are free with respect to the housing 80 but must rotate with shaft 17. By urging plates 82 and 84 into frictional engagement, rotative force may be transferred from the shaft to the housing or vice versa.

The outside clutch plate 87 is relatively thick and carries a plurality of projecting pins 88, the pins being secured in plate 87 as by having their inner ends 89 riveted over. Pins 88 slidably support a pressure plate 90, compression springs 91 encircling each of pins 88 being confined between plates 87 and 90. Pressure plate 90 is held against movement to the right along shaft 17 by means of adjusting nuts 92 threadedly engaging shaft 17. The innermost clutch plate 82 bears against a fibre plate 93 positioned against gear 40. The arrangement is such that springs 91 act against pressure plate 90 and nuts 92 to force clutch plates 82 and 84 together and against plate 93 and gear 40, movement of gear 40 to the left being opposed by the flange 79 on nut 75. The force exerted by springs 91 urging plates 82, 84 together can be varied by means of the adjusting nuts 92.

What is claimed is:

1. In a transmission mechanism, a driving pinion, a driven gear, an idler adapted to form a driving connection between the pinion and the gear, the axes of the driving pinion and driven gear being parallel, said idler being constantly in engagement with said driving pinion, means defining limits upon the position of the axis of the idler, to prevent complete disengagement of the driving pinion and the idler, as well as to limit the intermeshing of the idler and the driven gear, said idler, within the confines of said limits being otherwise capable of free bodily movement in any direction while its axis remains parallel to the axes of the pinion and the driven gear, and means continuously forming a point of rotation for the idler remote from the idler axis.

2. In a transmission mechanism, a driving pinion, a driven gear, an idler adapted to form a driving connection between the pinion and the gear, the axes of the driving pinion and driven gear being parallel, said idler being constantly in engagement with said driving pinion, means defining limits upon the position of the axis of the idler, to prevent complete disengagement of the driving pinion and the idler, as well as to limit the intermeshing of the idler and the driven gears, said idler, within the confines of said limits being otherwise capable of bodily movement while its axis remains parallel to the axes of the pinion and the driven gear, and unrestrained as to the path traversed by said axis, and means continuously forming a point of rotation for the idler remote from the idler axis whereby a torque exerted by the pinion on the idler may be rendered effective to cause the idler to engage the driven gear.

3. In a transmission mechanism, a driving pinion, a driven gear, an idler adapted to form a driving connection between the pinion and the gear, the axes of the driving pinion and driven gear being parallel, said idler being constantly in engagement with said driving pinion, means defining limits upon the position of the axis of the idler, said idler, within the confines of said limits being otherwise capable of free bodily movement while its axis remains parallel to the axes of the pinion and the driven gear, said limit defining means being so arranged that a torque exerted by the pinion on the idler may be rendered effective to cause the idler to engage the driven gear, and means operating continuously upon said idler to cause said idler to have a component of motion angularly about a pivot spaced from the idler axis in response to rotation of the idler by the driving pinion.

4. A driving gear, a driven gear, said gears having parallel axes, a floating idler adapted to be placed in operative relation between them, means forming a guide for restraining the motion of the axis of the idler about the driving gear so that the idler is restrained so as to engage or mesh with the driving gear, while at one extremity of the movement the idler is meshed with the driving gear as well as the driven gear, said idler being otherwise unrestrained to move in any direction, and means forming a fulcrum about which the idler pivots into mesh with the driven gear in response to movement by the driving gear.

5. In a device of the character described, a driving gear and a driven gear, said gears having parallel axes, a floating pinion adapted to form a driving connection between said gears, means maintaining said pinion constantly in engagement with the driving gear, and means acting eccentrically on said pinion to exert a continuous yielding force in a direction parallel to the axis of the pinion, restraining the pinion against free rotation on its axis to form a fulcrum about which the pinion is adapted to swing into mesh with the driven gear.

VERA C. HODGES.